(12) United States Patent
Sannes et al.

(10) Patent No.: US 7,632,218 B2
(45) Date of Patent: Dec. 15, 2009

(54) SURFING TRAINER APPARATUS

(75) Inventors: James Sannes, 2737 Lonesome Mountain Rd., Charlottesville, VA (US) 22911; Amy Sannes, Charlottesville, VA (US)

(73) Assignee: James Sannes, Charlottesville, VA (US)

( * ) Notice: Subject to any disclaimer, the term of this patent is extended or adjusted under 35 U.S.C. 154(b) by 0 days.

(21) Appl. No.: 12/035,284

(22) Filed: Feb. 21, 2008

(65) Prior Publication Data

US 2009/0215342 A1 Aug. 27, 2009

(51) Int. Cl.
*A63B 69/00* (2006.01)
*A63B 22/16* (2006.01)

(52) U.S. Cl. ............... 482/51; 482/79; 482/146

(58) Field of Classification Search ........... 482/23, 482/26, 34, 51, 55, 56, 77, 79, 80, 146, 147, 482/71, 132, 142; 472/114, 127–129, 135; 273/449; 441/74; 446/396; 5/81.1 RP; 280/842; 434/60, 253; D21/399, 412, 421, D21/688, 689, 769

See application file for complete search history.

(56) References Cited

U.S. PATENT DOCUMENTS

| | | | |
|---|---|---|---|
| 1,395,698 A * | 11/1921 | Baum et al. .................. 472/25 |
| 3,024,021 A | 3/1962 | Coplin | |
| 3,586,321 A * | 6/1971 | Gehrke et al. ............... 482/146 |
| 3,761,084 A * | 9/1973 | Dieckmann ................ 273/444 |
| 4,289,306 A * | 9/1981 | Thomas ....................... 472/26 |
| 4,491,318 A * | 1/1985 | Francke ..................... 482/147 |
| 4,653,748 A | 3/1987 | Seel | |
| 4,817,950 A * | 4/1989 | Goo ............................. 463/36 |
| 5,048,823 A | 9/1991 | Bean | |
| 5,292,296 A * | 3/1994 | Davignon ................... 482/146 |
| 5,509,871 A | 4/1996 | Giovanni | |
| 5,584,787 A | 12/1996 | Guidry | |
| 5,603,334 A | 2/1997 | Sharp | |
| 5,730,690 A | 3/1998 | Guidry | |
| 5,810,703 A | 9/1998 | Stack | |
| 5,897,474 A | 4/1999 | Romero | |
| 6,019,712 A | 2/2000 | Duncan | |
| 6,543,769 B1 * | 4/2003 | Podoloff et al. ......... 273/148 B |
| 6,616,583 B1 | 9/2003 | Stack | |
| 6,916,276 B1 | 7/2005 | Robinson | |
| 6,945,920 B1 | 9/2005 | Kemery | |
| 7,094,183 B2 | 8/2006 | Hsieh | |
| 7,137,938 B2 * | 11/2006 | Gottlieb ..................... 482/146 |
| 7,264,580 B2 * | 9/2007 | Lu ............................. 482/146 |
| D564,604 S * | 3/2008 | Mikail ...................... D21/688 |
| 7,374,517 B2 * | 5/2008 | Lockett ..................... 482/131 |
| 2003/0060297 A1 | 3/2003 | Cembalest | |
| 2003/0148865 A1 * | 8/2003 | Handshoe .................. 482/148 |

(Continued)

FOREIGN PATENT DOCUMENTS

DE 3150189 A1 * 7/1983

(Continued)

*Primary Examiner*—Loan H Thanh
*Assistant Examiner*—Victor K Hwang

(57) ABSTRACT

A surfing trainer apparatus comprises a board and a generally hemispherical fulcrum with the fulcrum attached to the lower surface of the board at the fulcrum's diametrical plane. The fulcrum is made of non-resilient material and has second planar surface distal to its diametrical plane and parallel to the lower surface of the board providing both a simulated point of limited stability as well as simulated instability in both pitch and roll.

15 Claims, 2 Drawing Sheets

U.S. PATENT DOCUMENTS

| | | |
|---|---|---|
| 2004/0023766 A1 | 2/2004 | Slone |
| 2004/0224824 A1 | 11/2004 | Lickle |
| 2006/0082089 A1 * | 4/2006 | Rejtano ................ 280/87.042 |
| 2006/0217250 A1 | 9/2006 | Pearson |

FOREIGN PATENT DOCUMENTS

| | | | |
|---|---|---|---|
| DE | 3620706 A1 | * | 12/1987 |
| EP | 1579891 A1 | * | 9/2005 |
| GB | 2144646 A | * | 3/1985 |
| JP | 10290845 A | * | 11/1998 |
| JP | 2003225326 A | * | 8/2003 |
| WO | WO 2008009068 A1 | * | 1/2008 |

\* cited by examiner

US 7,632,218 B2

SURFING TRAINER APPARATUS

BACKGROUND OF THE INVENTION

1. Field of the Invention

This invention relates to a training device to allow individuals to learn balancing skills and techniques in general and specifically to learn and develop skills and techniques peculiar to the sport of surfing.

2. Introduction

A number of recreational activities require well developed balancing skills. Surfing, skateboarding, wind surfing, snowboarding and other activities require the participant to stand generally erect and balance upon a generally planar surface. In such sports, slight and frequent adjustments in balance are necessary in order to remain erect upon the surface. Additionally, changes in balance are also necessary in order effect a change in the direction of travel of the planar surface.

Surfing, in particular, requires honed balancing skills. Unlike skateboarding and snowboarding, both of which involve travel occurring over a generally firm surface, both surfing and windsurfing occur in water which is readily displaced as the board travels over the surface. Further, unlike windsurfing which permits the participant to use upper extremities as well as lower extremities for balancing adjustments, surfing requires all adjustments to be made by applying pressure to the planar surface (i.e. the surfboard) through the lower extremities.

Just as significantly, it is difficult and time-consuming to learn surfing skills in the water. Much of the time the surfer spends in the water is spent prone on the board paddling to a location in front of a shore-bound wave. Once the surfer arrives at the appropriate location and the board is being propelled by wave, the surfer may then stand erect on the board and surf. Considerable time and energy is expended, however, paddling to position. Novice surfers can easily become exhausted before they are able to spend any significant time erect on the surfboard.

There is, therefore, a need for an apparatus which can be used on shore and which allows surfers to learn balancing skills necessary to enjoy the sport. A number of devices have been disclosed for this purpose. Typical devices include a generally planar surface, which is often shaped similar to a surfboard, positioned above the ground surface in a manner that permits both fore and aft (pitch) and side to side (roll) to occur similar to that which may be experienced while surfing.

The balancing function of such devices is often accomplished by a fulcrum beneath the board. In such devices, the responsiveness of the board to balancing adjustments is influenced by the size and shape of the fulcrum, as well as by whether it is attached to the board and the resiliency of the material from which it is made. A spherical fulcrum allows for full pitch and roll in every direction. However, if the spherical fulcrum is not affixed to the board it is difficult for the user both to mount the board and to retain the board on the fulcrum without the board displacing off of the fulcrum.

In U.S. Application Publication 2004/0224824 (Lickle), the applicant discloses a surfboard training device utilizing a spherical fulcrum. Lickle attempts to overcome some disadvantages of the spherical fulcrum by fashioning a concave area on the under surface of the board to retain the sphere. Alternatively, Lickle discloses a harness means which tethers the board to the fulcrum. Neither alternative is fully effective in retaining the board on the fulcrum. Additionally, the harness means is particularly suited only for spherical fulcrums made of resilient materials, for example, an inflatable bladder or a bladder filled with fluid. Fulcrums made of resilient materials diminish the quality of the simulation, as discussed herein. Moreover, short tethers, which are most effective in retaining the board on the fulcrum, also reduce the effectiveness of the simulation for training.

Hemispherical fulcrums have also been described in the prior art. For example, both U.S. Pat. No. 5,810,703 (Stack) and U.S. Pat. No. 6,945,920 (Kemery, et al.) disclose exercise boards with fulcrums which are generally hemispherical and which can be adjusted either to increase or decrease stability. Like spherical fulcrums, a hemispherical fulcrum allows for full pitch and roll. Unlike spherical fulcrums, hemispherical fulcrums are readily attached to the board by affixing the diametrical plane of the hemispherical fulcrum to the under-surface of the board since the diametrical plane of the hemisphere offers a suitable attaching point.

Both spherical and hemispherical fulcrums allow full pitch and roll. However, particularly when made of non-resilient material, both also suffer the disadvantage that they fail to provide even limited stability in any plane. While a surfboard traveling in water has some limited stability, thus permitting a user to stand erect from the prone position, a surfboard balanced on a spherical or hemispherical fulcrum is easily displaced from balance from the slightest force applied anywhere other than at its center of gravity. This is particularly true if the fulcrum is made of non-resilient material.

Where the fulcrum is constructed of resilient material, some stability is achieved because the spherical or hemispherical form of the fulcrum deforms slightly providing a plane at the base of the fulcrum. Such deformation not only occurs when the board is horizontal (i.e. when the user is simulating the general stability which occurs when a surfboard is traveling through water), but also when the user attempts to deviate fore and aft or side to side with balance adjustments. Deformation causing limited stability in these adjustments is not preferable because it simulates a limited stability generally not experienced in the operation a board under actual conditions. In other words where a spherical or hemispherical resilient fulcrum is used, the deformation and the accompanying limited stability created results in an inaccurate simulation of the operation of a surfboard.

The invention disclosed in U.S. Pat. No. 5,509,871 (Giovanni) attempts to overcome this limitation by providing a spring assembly with pneumatic shock absorbers in lieu of a fulcrum to simulate operation of a board. While the use of these devices may accurately simulate limited stability that is experienced in the horizontal plane, these also provide unrealistic simulated stability when the board is oriented other than in the horizontal plane. Just as importantly, the expense and complexity of the invention makes it impractical and uneconomical for many recreational surfers.

There is, therefore, a need for a surfing trainer apparatus which accurately simulates limited stability when the board is oriented in the horizontal plane while also providing realistic instability when the board is oriented otherwise. There is also the need for an economical and simple surfing trainer apparatus which is inexpensive and easy to manufacture and operate.

3. Objects of the Invention

It is an object of the invention to provide a surfing trainer apparatus which simulates limited stability when the surfboard is in the horizontal plane but which also accurately simulates instability when the board is situated otherwise. It is also an object of the invention to provide a surfing trainer apparatus which is inexpensive to manufacture and which is simple in construction and operation.

BRIEF SUMMARY OF THE INVENTION

These and other objects are realized by a surfing trainer apparatus comprised of a generally planar surface mounted upon a generally hemispherical fulcrum. The generally hemispherical fulcrum is made of non-resilient material and is affixed to the undersurface of the board such that center of the fulcrum is slightly forward of the board's center of gravity. A distal portion of the fulcrum comprises a second planar surface. This second planar surface is generally parallel with the surface of the board. In a board having a width of approximately 11 inches a generally hemispherical fulcrum having a diametrical plane with a radius of between 4 and 5 inches is preferred. The second planar surface of the fulcrum preferably comprises a circular area having a radius of between 1 and 3 inches.

BRIEF DESCRIPTION OF THE DRAWINGS

The invention is described in detail with reference to the following drawings in which like reference numerals refer to like elements.

DETAILED DESCRIPTION OF THE INVENTION

Figure 1:
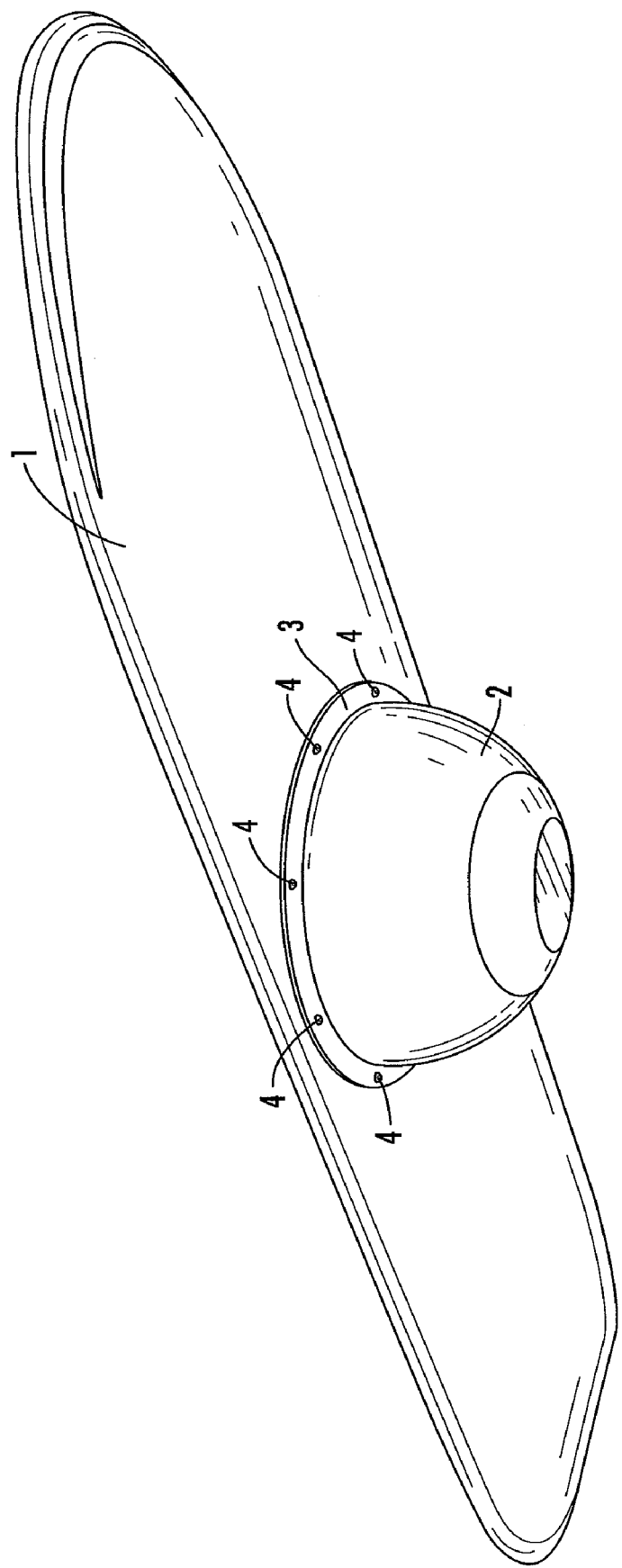
FIG. 1 is a perspective side view of a preferred embodiment of the invention.

With reference to FIG. 1, a preferred embodiment of the invention comprises a planar board (1), the upper surface of which is disposed for a surfing trainer to stand erect and balance. The board (1) is preferably shaped in the form of a surfboard and may be constructed of any non-resilient material, including wood, fiberglass or plastic. Generally a board with a length of approximately four feet and a width of between 11 and 15 inches is preferred.

Figure 3:
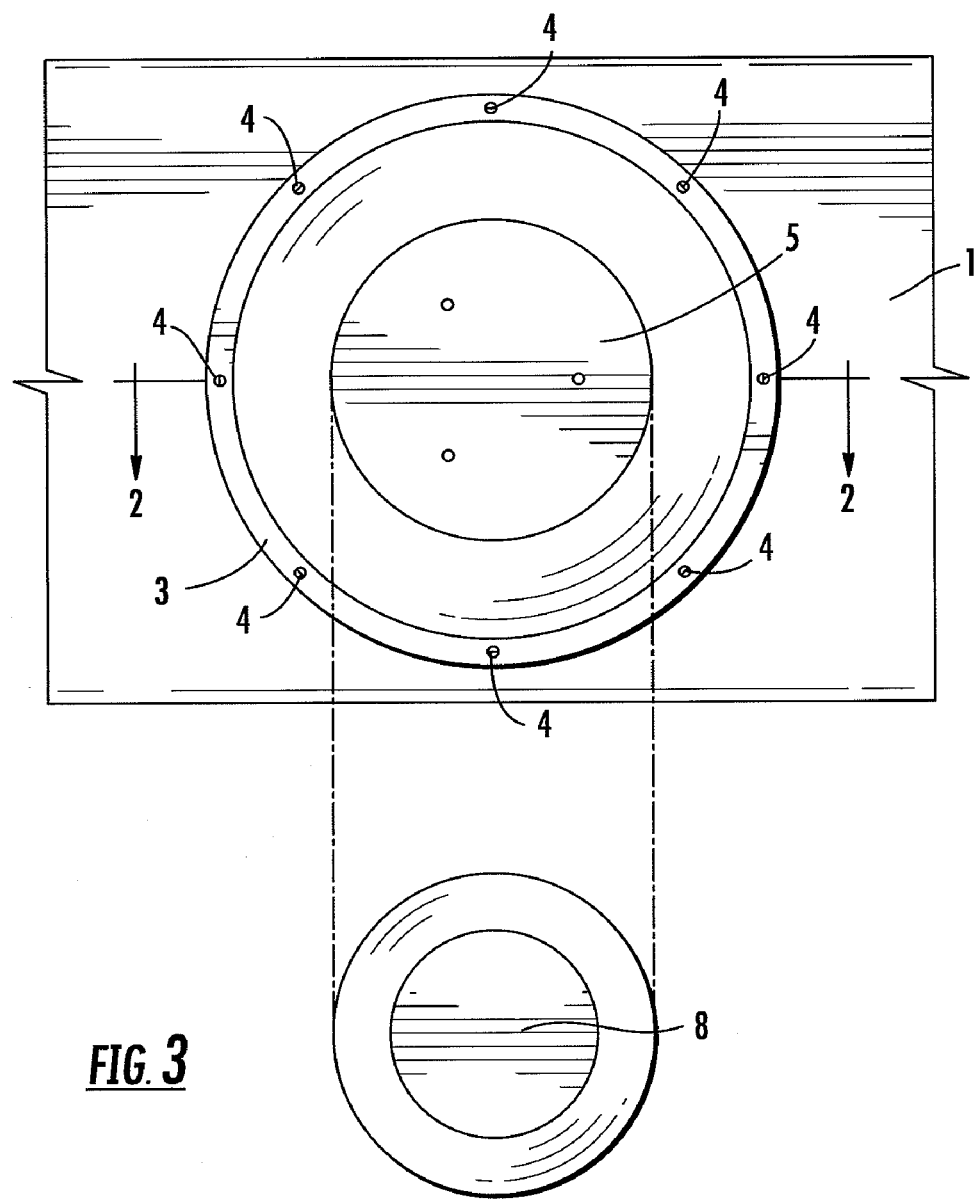
FIG. 3 is a perspective bottom view of a disassembled, two-part fulcrum of a preferred embodiment of the invention.

A generally hemispherical fulcrum (2) is affixed to the lower surface of the board. The fulcrum comprises an upper and a lower part. The upper part comprises an annular lip (3), as best shown in FIG. 3, which extends outward from the hemisphere's diametrical plane proximate to the lower surface of the board. The lip is fashioned with a plurality of holes and the upper part of the fulcrum is affixed to the board with suitable fasteners (4), for example wood screws, extending through these holes.

Figure 2:
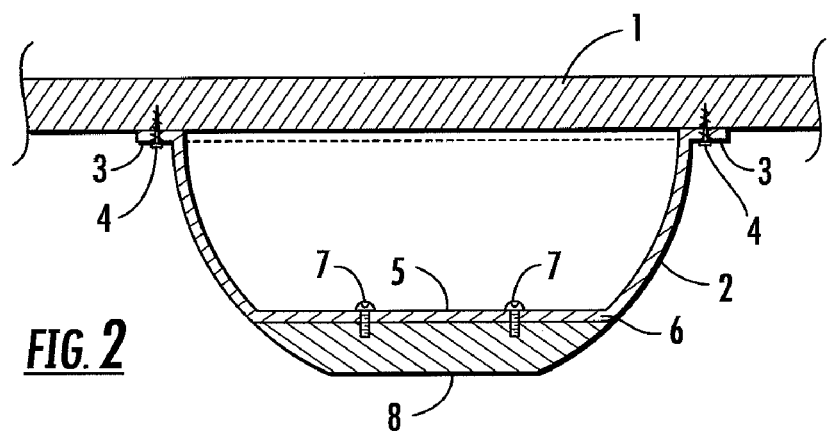
FIG. 2 is a sectional side view of a fulcrum of the preferred embodiment of the invention.

The upper part of the fulcrum may be constructed of any non-resilient material. The upper part may economically be fashioned of acrylonitrile butadiene styrene (ABS) plastic through vacuum forming. Preferably and as best shown in FIG. 2, the upper part is hollow and comprises a planar wall (5) distal to the annular lip (3).

The lower part of the fulcrum comprises a planar wall (6) which mates with the planar wall (5) of the upper part. Fasteners (7), for example screws, are disposed to connect the upper part to the lower part and extend from inside the hollow cavity of the upper part through the planar wall (5) to the lower part of the fulcrum. The lower part of the fulcrum comprises a bearing planar surface (8), distal to the diametrical plane of the fulcrum and parallel to it. The bearing planar surface (8) provides the base of the fulcrum.

The lower part of the fulcrum comprises the principal load bearing surface of the apparatus during use and is constructed of non-resilient material in order that the instability in pitch and roll of the apparatus simulate the instability of a surfboard in use. Wood, concrete, fiberglass, high density polyethylene (HDPE) or other materials are suitable for the construction of this part. Preferably the lower part is formed by machining a solid piece of HDPE.

It will be recognized that through use, the lower part of the fulcrum will wear. In particular, the second planar surface will wear such that the size of the second planar surface increases. When the amount of wear becomes unacceptable the lower part of the fulcrum may be replaced. It will also be recognized that as the user becomes more skilled at operating the apparatus, the lower part may be replaced with a new lower part having a bearing planar surface with a smaller diameter, thus increasing the skill necessary to operate the apparatus.

Generally, it is preferable to mount the fulcrum slightly forward of the center of gravity of the board. Thus, at rest, the aft portion of the board will be in contact with the ground.

In operation, the apparatus is mounted by the user when the aft portion of the board is in contact with the ground. The user then assumes a position upon the board in which the board is balanced upon the fulcrum with the bearing planar surface (8) in contact with a firm surface. Once mounted, the user may make balancing adjustments, thereby changing the orientation of the board either in pitch (fore and aft) or in roll (side to side). These adjustments also change the portion of the fulcrum in contact with the ground from the bearing planar surface (8) to a curved portion of the hemispherical shape. By a careful balancing re-adjustment, the user may return the board to the limited stability position, that is, with the fulcrum resting on its bearing planar surface (8).

It will be recognized that the diameter of the generally hemispherical fulcrum will influence the nature of the pitch and roll experienced by user when using an apparatus according to the invention. It is preferred that the diameter of the diametrical plane of the fulcrum be at least ¾ the width of the board. Similarly, it should be recognized that the diameter of the second planar surface will influence the amount of stability experienced by the user. In an apparatus comprising a board with a width of 11 inches, a diametrical planar surface at least 6 inches in diameter is preferred. Additionally, it is preferred that the diameter of the second planar surface be between ⅛ and ⅜ of the diameter of the diametrical planar surface.

The invention has been described in regard to its preferred embodiment. It will be apparent to those skilled in the art that the same may be varied in many ways without departing from the spirit and scope of the invention. All such modifications are intended to be included within the scope of the following claims.

We claim:

1. A surfing trainer apparatus comprising:
   a board having a width and an upper and lower surface;
   a generally hemispherical fulcrum, said fulcrum affixed to said lower surface of said board at said fulcrum's diametrical plane;
   said fulcrum further comprising a hollow upper part and a solid lower part, said hollow upper part comprising said diametrical plane and a planar wall distal to said diametrical plane, said lower part comprising a second planar wall removably connected to said hollow upper part planar wall and a bearing planar surface distal to said second planar wall and distal to said diametrical plane.

2. The surfing trainer apparatus of claim 1 wherein said fulcrum is non-resilient.

3. The surfing trainer apparatus of claim 2 wherein said fulcrum is made of high density polyethylene.

4. The surfing trainer apparatus of claim 1 wherein said bearing planar surface is parallel to said lower surface.

5. The surfing trainer apparatus of claim 4 wherein the diameter of said diametrical plane is at least three-quarters the width of said board.

6. The surfing trainer apparatus of claim 5 wherein the diameter of said bearing planar surface is between one-eighth and three-eighths of the diameter of said diametrical plane.

7. The surfing trainer apparatus of claim 1 wherein the fulcrum is affixed to said lower surface forward of the center of gravity of said board.

8. A surfing trainer apparatus comprising
a board having a width and an upper and lower surface;
a generally hemispherical fulcrum, said fulcrum having a first and second part;
said first part comprising an annular lip extending outward from the diametrical plane of said generally hemispherical fulcrum and said first part further comprising a planar wall distal to said diametrical plane;
said second part comprising a planar wall corresponding to said planar wall of said first part and said second part further comprising a bearing planar surface distal to said planar wall of said second part;
wherein said planar wall of the second part is affixed to said planar wall of the first part and wherein said annular lip of said first part is affixed to the lower surface of said board.

9. The surfing trainer apparatus of claim 8 wherein said fulcrum is non-resilient.

10. The surfing trainer apparatus of claim 8 wherein said second part of said fulcrum is non-resilient.

11. The surfing trainer apparatus of claim 10 wherein said second part of said fulcrum is made of high density polyethylene.

12. The surfing trainer apparatus of claim 8 wherein said bearing planar surface is parallel to said lower surface.

13. The surfing trainer apparatus of claim 12 wherein the diameter of said diametrical plane is at least three-quarters the width of said board.

14. The surfing trainer apparatus of claim 13 wherein the diameter of said bearing planar surface is between one-eighth and three-eighths of the diameter of said diametrical plane.

15. The surfing trainer apparatus of claim 8 wherein said fulcrum is affixed to said lower surface forward of the center of gravity of said board.

* * * * *